(12) United States Patent
Kaneda (10) Patent No.: US 10,855,875 B2
(45) Date of Patent: Dec. 1, 2020

(54) IMAGE FORMING APPARATUS, IMAGE PROCESSING METHOD, AND STORAGE MEDIUM

(71) Applicant: CANON KABUSHIKI KAISHA, Tokyo (JP)

(72) Inventor: Kanako Kaneda, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/524,274

(22) Filed: Jul. 29, 2019

(65) Prior Publication Data

US 2020/0045203 A1 Feb. 6, 2020

(30) Foreign Application Priority Data

Aug. 2, 2018 (JP) .................. 2018-145884

(51) Int. Cl.
*H04N 1/21* (2006.01)
*G06T 1/00* (2006.01)

(52) U.S. Cl.
CPC ............. *H04N 1/2104* (2013.01); *G06T 1/00* (2013.01)

(58) Field of Classification Search
CPC .... G06T 1/00; H04N 1/2104; H04N 1/00204; H04N 2201/0094; H04N 1/29; H04N 1/4433; H04N 2201/3297; H04N 1/40031; H04N 2201/0039; H04N 1/00307; H04N 1/00933; H04N 1/0096; H04N 1/32101; H04N 1/32358; H04N 1/40043; H04N 1/4413; H04N 2201/001; H04N 2201/0081; H04N 2201/0082; H04N 2201/0091; H04N 2201/3214; H04N 2201/3215; H04N 2201/3226; H04N 2201/3274; H04N 2201/3278; H04N 2201/3287; H04N 1/00212; H04N 1/00214; H04N 1/00217; H04N 1/00278; H04N 1/00347; H04N 1/00424; H04N 1/00474; H04N 1/00482; H04N 1/32144; H04N 1/32614;
(Continued)

(56) References Cited

U.S. PATENT DOCUMENTS 7,277,584 B2 10/2007 Nakanishi et al.
7,317,833 B2 1/2008 Kaneda
(Continued)

FOREIGN PATENT DOCUMENTS

JP 2007-116458 A 5/2007

*Primary Examiner* — Negussie Worku
(74) *Attorney, Agent, or Firm* — Venable LLP (57) ABSTRACT

An apparatus including a control device, a first processing device, a second processing device, and one or more memories, wherein the first processing device issues a signal based on the first processing device having processed a predetermined amount of data in received image data so that an engine controller starts to obtain image data from the one or more memories, wherein the control device provides dummy data to the first processing device so that the first processing device processes the dummy data and issues the signal, wherein the control device provides to the one or more memories, not via the first or second processing device, image data to be printed, wherein the second processing device discards the dummy data processed by the first processing device, and wherein the engine controller obtains the image data to be printed from the one or more memories.

12 Claims, 9 Drawing Sheets

(58) Field of Classification Search
CPC ........... H04N 1/32641; H04N 1/32657; H04N 1/32662; H04N 1/333; H04N 1/387; H04N 1/40068; H04N 1/40081; H04N 1/4055; H04N 1/4057; H04N 1/4058; H04N 1/642; H04N 2201/0036; H04N 2201/0041; H04N 2201/0049; H04N 2201/0053; H04N 2201/0055; H04N 2201/006; H04N 2201/0096; H04N 2201/3242; H04N 2201/3264; H04N 2201/3267; H04N 2201/3269; H04N 2201/33314; H04N 2201/33378; G03G 15/043; G03G 15/5075; G03G 2215/00109; G03G 15/55; G03G 15/01; G03G 15/0115; G03G 15/04054; G03G 15/5008; G03G 15/5091; G03G 2215/00113; G06K 15/005; G06K 15/027; G06K 15/00; G06K 15/14; G06K 15/1825; G06K 15/1881; G06K 15/02; G06K 15/107; G06K 15/1247; G06K 15/1853; G06K 15/1889; G06K 15/4055; G06K 2215/0002; G06K 2215/0057; G06K 15/12; G06K 15/129; G06K 15/1813; G06K 15/1817; G06K 15/1822; G06K 15/184; G06K 15/1851; G06K 15/1855; G06K 15/1857; G06K 15/186; G06K 15/1865; G06K 15/1873; G06K 15/1897; G06K 2215/0011; G06K 2215/0014; G06K 2215/0045; G06K 2215/0065; G06K 2215/0068; G06K 2215/0094; G06F 3/1285; G06F 3/1208; G06F 21/608; G06F 3/1205; G06F 3/1219; G06F 3/1221; G06F 3/1229; G06F 3/1232; G06F 3/1243; G06F 3/1254; G06F 3/1256; G06F 3/126; G06F 3/1286; G06F 3/1288; G06F 9/00; G06F 15/00; G06F 21/10; G06F 21/105; G06F 2221/2137; G06F 2221/2151; G06F 3/1203; G06F 3/1204; G06F 3/1236; G06F 3/1258; G06F 3/1292; G06F 3/1297; G06F 7/32; G07C 9/28; Y02D 10/1592; H04L 61/2007; H04L 63/083; H04W 4/023; H04W 4/80; H04W 68/005; H04W 76/11; H04W 76/14; H04W 76/18; H04W 84/12; H04W 88/08

USPC ........................................................ 358/504

See application file for complete search history.

(56) References Cited

U.S. PATENT DOCUMENTS

| | | | |
|---|---|---|---|
| 8,477,324 B2* | 7/2013 | Miyagi | H04N 1/56 358/1.13 |
| 8,537,430 B2 | 9/2013 | Kaneda | |
| 9,912,856 B2* | 3/2018 | Iwasaki | H04N 5/23216 |
| 2008/0100855 A1* | 5/2008 | Yoshida | B41J 2/2128 358/1.8 |
| 2013/0278952 A1* | 10/2013 | Suzuki | H04N 1/54 358/1.9 |
| 2013/0301083 A1 | 11/2013 | Kaneda | |
| 2014/0063517 A1* | 3/2014 | Tachibana | H04N 1/00663 358/1.12 |
| 2015/0103375 A1* | 4/2015 | Mihira | G06F 3/1288 358/1.15 |
| 2015/0261481 A1* | 9/2015 | Takenaka | G06F 3/1285 358/1.15 |
| 2016/0148952 A1* | 5/2016 | Chen | H01L 27/124 257/390 |
| 2016/0214411 A1* | 7/2016 | Wakayama | G06K 15/4065 |
| 2017/0011283 A1* | 1/2017 | Fukuda | G06K 15/184 |
| 2017/0155799 A1* | 6/2017 | Achiwa | G06K 15/184 |
| 2017/0187916 A1* | 6/2017 | Ohta | H04N 1/2104 |
| 2018/0053075 A1* | 2/2018 | Kubo | G06K 15/1817 |
| 2018/0082160 A1* | 3/2018 | Nakane | G06K 15/1813 |
| 2019/0007571 A1* | 1/2019 | Ito | H04N 1/00724 |
| 2019/0080479 A1* | 3/2019 | Totsuka | G06T 1/00 |
| 2019/0096093 A1* | 3/2019 | Shinoda | G06T 11/001 |
| 2019/0113872 A1* | 4/2019 | Kanakubo | G03G 15/556 |
| 2019/0303081 A1* | 10/2019 | Nishikawa | G06K 15/02 |
| 2019/0306370 A1* | 10/2019 | Itoh | H04N 1/4058 |

* cited by examiner

IMAGE FORMING APPARATUS, IMAGE PROCESSING METHOD, AND STORAGE MEDIUM

BACKGROUND OF THE INVENTION

Field of the Invention

The technique of the present disclosure relates to a technique for performing proof print to directly print digital image data.

Description of the Related Art

A conventional image formation apparatus such as a multifunction printer (MFP) can execute multiple processes (e.g., copy job, print job, scan job, and SEND job) based on requests from a user. Image processing performed in those jobs is implemented by hardware or software mounted in an image processing controller in the image formation apparatus. The image processing executed herein includes various kinds of processing including conversion processing to an image data format for input and output to a scanner and a print engine and conversion processing to an image data format for the image processing performed in the image formation apparatus.

Japanese Patent Laid-Open No. 2007-116458 discloses a technique of various kinds of image processing executed on image data in an MFP. The various kinds of image processing are, for example, decompression processing and raster conversion processing of compressed packet data stored in an image memory and color conversion processing and halftone processing of image data obtained by the raster conversion.

In offset printing, digital proof is used as a way to allow a user to easily create a print sample for printing of a pamphlet and poster. Since the digital proof makes it possible to provide the print sample by direct printing of image-processed and uncompressed digital image data owned by the user, the color proof can be easily obtained at relatively low cost. Given the circumstances, there has been a consideration to apply the digital proof to the MFP.

SUMMARY OF THE INVENTION

As disclosed in Japanese Patent Laid-Open No. 2007-116458, the MFP has a configuration to execute image processing on image data within the MFP. For this reason, even though image-processed image data is inputted, the conventional MFP is incapable of executing the proof print by directly printing from the image data without the image processing.

Usually, the MFP receives input of compressed image data for printing. In contrast, the MFP receives input of image-processed and uncompressed image data for the proof print. Thus, a volume of the data processed for printing of the proof print is extremely greater than that of normal printing. Additionally, since uncompressed image data is used, a speed of supplying the image data to a memory for inter-drum delay is lower than that in the normal printing using compressed data. For this reason, unless inter-drum delay control different from that for the normal printing is performed for the proof print printing, there is a possibility that the proof print cannot be executed properly due to shortage of buffers for the image data. Additionally, in order to achieve such inter-drum delay control, a control sequence different from a control sequence of the normal printing is required to be implemented, and this may complicate a configuration of an image processing controller.

An image forming apparatus according to the technique of the present disclosure includes: a first image processing device that executes first image processing on inputted first image data; a second image processing device that executes second image processing on the first image data on which the first image processing is performed; a memory that stores the first image data on which the second image processing is performed; a first controller that outputs a signal every time the first image processing device processes a predetermined amount of data; an output device that outputs the first image data on which the second image processing is performed from the memory to a print unit based on the signal outputted by the first controller; and a second controller that allows the first image processing device to process third image data based on input of second image data to the second image processing device, the second image data not being inputted to the first image processing device, in which, based on the signal outputted by the first controller every time the first image processing device processes a predetermined amount of the third image data, the output device outputs the second image data on which the second image processing is performed by the second image processing device to the print unit.

Further features of the present invention will become apparent from the following description of exemplary embodiments with reference to the attached drawings.

DESCRIPTION OF THE EMBODIMENTS

Embodiments of the technique of the present disclosure are described below with reference to the drawings. The constituents described in the following embodiments indicate a mode as merely an example of the technique of the present disclosure and are not intended to limit the scope of the technique of the present disclosure to the mode.

First Embodiment

[Description of Operations of Image Formation Apparatus]

Figure 1:
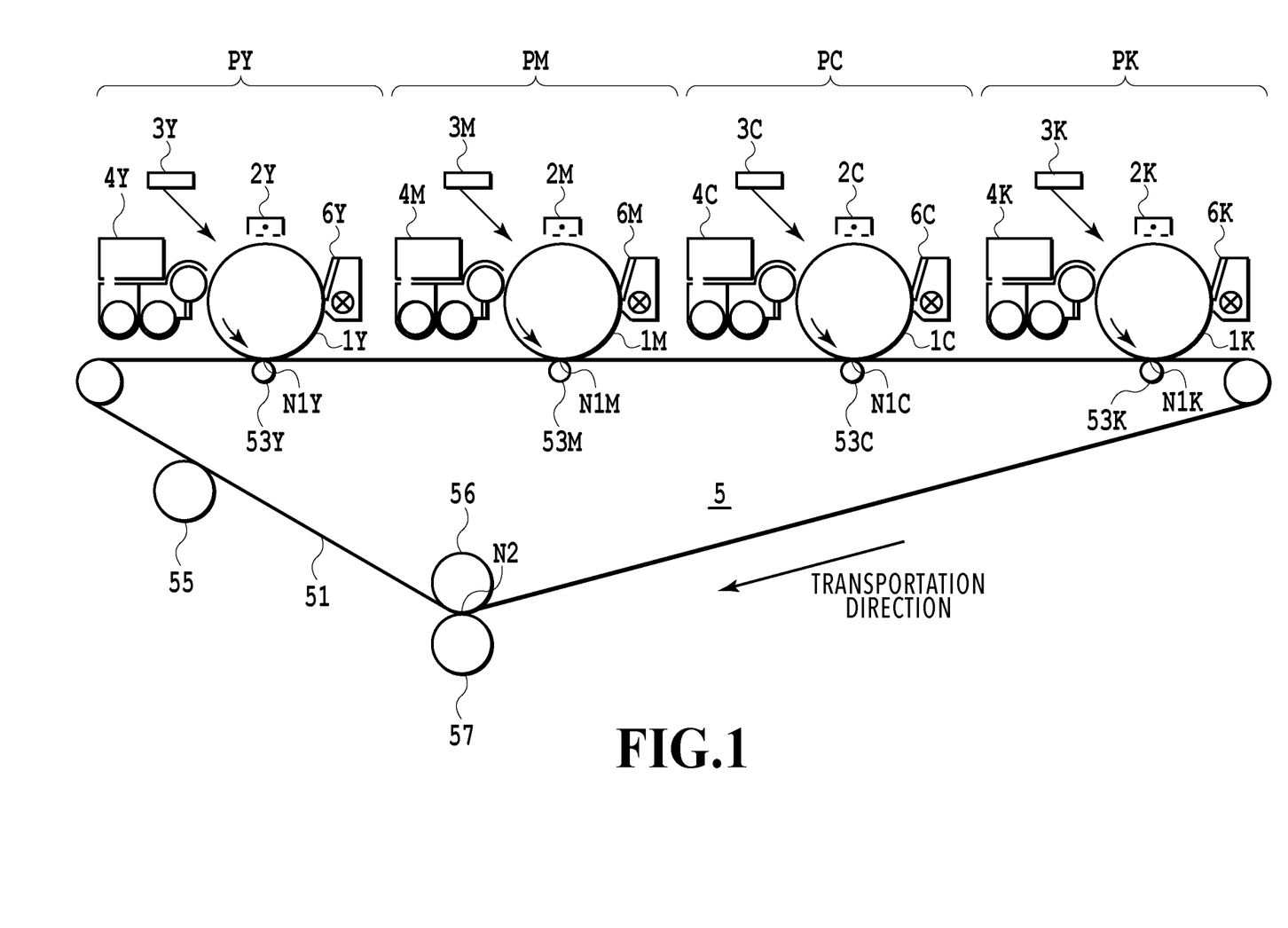
FIG. 1 is a diagram that illustrates an example of a configuration of a print engine of an image formation apparatus of a first embodiment.

First, operations of image formation in an electrophotographic color image formation apparatus are described with reference to FIG. 1. FIG. 1 is a diagram that illustrates an example of a configuration of a print engine of an image formation apparatus of a first embodiment. As illustrated in FIG. 1, the image formation apparatus of this embodiment is a full-color electrophotographic image formation apparatus using an intermediate transfer body, which is an MFP, for example. The image formation apparatus of this embodiment includes four image formation units that respectively form toner images using corresponding colors of toner of yellow (Y), magenta (M), cyan (C), and black (K). Hereinafter, the image formation units for the toner of yellow (Y), magenta (M), cyan (C), and black (K) are respectively called a process unit PY, a process unit PM, a process unit PC, and a process unit PK. As illustrated in FIG. 1, the process units PY, PM, PC, and PK are arranged in this order along a peripheral surface of an intermediate transfer belt from upstream to downstream of a moving direction of the peripheral surface (from left to right in FIG. 1).

The process unit P (PY, PM, PC, and PK) includes a photosensitive drum 1 (1Y, 1M, 1C, and 1K) as an image carrier, and a corona charging unit 2 (2Y, 2M, 2C, and 2K) as a primary charging unit is arranged around the photosensitive drum 1. Additionally, an exposure device 3 (3Y, 3M, 3C, and 3K), a development device 4 (4Y, 4M, 4C, and 4K), and a cleaner 6 (6Y, 6M, 6C, and 6K) are arranged around the photosensitive drum 1.

Image formation is performed in the order of processes from charging, exposing, developing, transferring, and fixing. The operations are described below.

(Charging)

First, the corona charging unit 2 uniformly charges the surface of the photosensitive drum 1 to a predetermined polarity and potential. Each photosensitive drum includes a central support shaft that transmits a driving force from a driving motor (unillustrated) and allows the photosensitive drum to rotate counterclockwise (counterclockwise in FIG. 1).

(Exposing)

Next, the exposure device 3 scans the photosensitive drum 1 while turning off and on laser light based on recording-target image data and forms an electrostatic latent image on the photosensitive drum 1.

(Developing)

Next, the development device 4 develops an image by applying the toner to an exposed part of the electrostatic latent image with a magnetic brush in a development region and forms a toner image on the photosensitive drum 1.

(Transferring)

Next, transferring is performed by an intermediate transfer unit 5 including an intermediate transfer belt (intermediate transfer body) 51, a transfer roller 53 (53Y, 53M, 53C, and 53K), secondary transfer rollers 56 and 57, and an intermediate transfer belt cleaner 55. The transferring includes primary transfer from the photosensitive drum 1 to the intermediate transfer belt 51 and secondary transfer from the intermediate transfer belt to a recording medium. Now, the primary transfer and the secondary transfer are described.

The intermediate transfer belt 51 is rotated clockwise (clockwise in FIG. 1), and additionally the photosensitive drum 1 and the transfer roller (primary transfer roller) 53 opposing to the photosensitive drum 1 are rotated. In this way, a single-color toner image is formed on the intermediate transfer belt 51. The single-color toner image can be transferred on the intermediate transfer belt 51 (primary transfer) by applying a proper bias voltage to the transfer roller 53 and giving a difference between rotational speeds of the transfer roller 53 and the photosensitive drum 1. An adhering object such as remaining toner and the like on the surface of the photosensitive drum 1 after the transferring of the toner image is removed by the cleaner 6.

A yellow toner image formed on the photosensitive drum 1Y of the process unit PY is transferred on the intermediate transfer belt 51 by rotating the photosensitive drum 1Y in a primary transfer unit N1Y. The yellow toner image transferred on the intermediate transfer belt 51 is transported by moving the peripheral surface of the intermediate transfer belt 51. Then, synchronizing with the movement of the yellow toner image on the intermediate transfer belt 51, magenta, cyan, and black toner images respectively formed by the process units PM, PC, and PK are overlapped and transferred on the yellow toner image in the order of the photosensitive drums 1M, 1C, and then 1K. In this process, the transferring of the magenta, cyan, and black toner images are respectively performed by primary transfer units N1M, N1C, and N1K. In this way, a multicolor toner image (full-color image) made of the four colors is formed on the surface of the intermediate transfer belt 51. With the intermediate transfer belt 51 rotated, the multicolor toner image is transported to a secondary transfer unit N2 including the secondary transfer rollers 56 and 57. Then, the recording medium such as a recording sheet (unillustrated) is pinched and transferred from a feed tray (unillustrated) to the secondary transfer rollers 56 and 57, and the multicolor toner image on the intermediate transfer belt 51 is transferred to the recording medium. In this process, the toner image is electrostatically transferred (secondary transfer) by applying a proper bias voltage to the secondary transfer rollers 56 and 57. During the transferring of the multicolor toner image on the recording medium, the secondary transfer roller 57 is in contact with the recording medium at a position shown in FIG. 1, and after the transferring, the secondary transfer roller 57 is moved downward from the position shown in FIG. 1 (downward in FIG. 1) to be away from the recording medium.

(Fixing)

At last, with a fixing roller and a pressure roller of a fixing device (unillustrated) applying heat and pressure to the multicolor toner image transferred on the recording medium, the multicolor toner image is fused and fixed on the recording medium. In this process, a heater of the fixing device is controlled, and the fixing operation is performed with surface temperatures of the rollers adjusted. The recording medium after the toner fixing is discharged to a discharge tray (unillustrated) by a discharging roller (unillustrated). Then, the sequential operations of the image formation end.

[Description of Operations of Controller 201]

Figure 2:
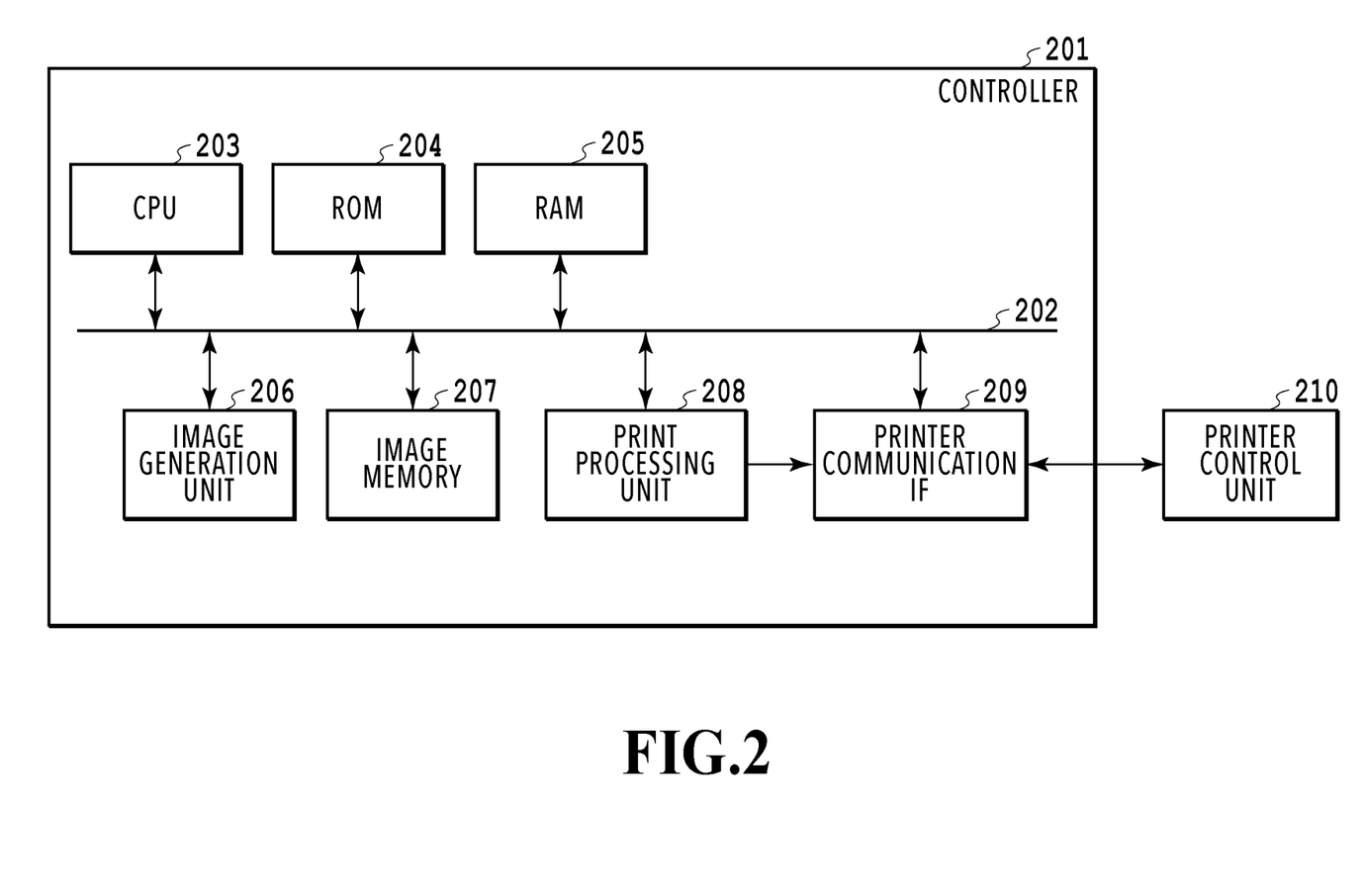
FIG. 2 is a block diagram that illustrates a configuration of a controller of the image formation apparatus of the first embodiment.

First, a configuration of an image processing controller (hereinafter, simply called a controller or may be called an image forming apparatus) 201 of the image formation apparatus are described with reference to FIG. 2. FIG. 2 is a block diagram that illustrates a configuration of the controller 201 of the image formation apparatus of the first embodiment. The controller 201 includes a CPU 203, a ROM 204, a RAM 205, an image generation unit 206, an image memory 207, a print processing unit 208, and a printer communication interface (IF) 209. These constituents are connected to each other through a bus 202. In this embodiment, highspeed input and output processing of image data is performed within the controller 201 through the bus 202. In this embodiment, compressed packet data that is generated from raster image data compressed by JPEG and the like with a pixel unit of a predetermined size (e.g., 32×32 pixel) is used as the image data. The controller 201 is communicably connected with a printer control unit 210 that controls the print engine illustrated in FIG. 1 through the printer communication IF 209. The printer control unit 210 may be provided in either sides of the print engine and the controller 201.

According to an initial program stored in the ROM 204, the CPU 203 reads a main program from the ROM 204 and stores the main program in the RAM 205. The CPU 203 executes the program stored in the RAM 205 to execute the sequential processing in the later-described FIGS. 5A, 5B, 6, and 8. The RAM 205 used for storing the abovementioned program is also used as a work memory.

The image generation unit 206 generates the raster image data, which includes RGB data that can be printed and attribute data that indicates a data attribute of each pixel, from image data (in this case, PDL image data) received from an unillustrated computer device and the like. The image generation unit 206 generates the compressed packet data from the generated raster image data and stores the compressed packet data in the image memory 207. A reading unit may be provided in the image formation apparatus itself to allow the image generation unit 206 to obtain the image data read by the reading unit. A scanner with a reading system such as charged couple device (CCD) or contact image sensor (CIS) may be used as the reading unit, for example. With the reading unit, an image processing unit that performs predetermined image processing on the image data read by the reading unit may be provided. Otherwise, the reading unit may not be provided in the image formation apparatus itself, and the image data may be received from an external reading unit through an unillustrated interface.

The image memory 207 is an image processing work memory in the controller 201 and stores the compressed packet data generated through various jobs. The image memory 207 is used as an inter-drum delay control buffer for the later-described print job.

The print processing unit 208 inputs the compressed packet data, which is generated by the image generation unit 206 and stored in the image memory 207, and the uncompressed raster image data for the proof print processing. Then, the print processing unit 208 outputs image-processed image data, which is generated by executing various kinds of image processing on the inputted image data, to the printer communication IF 209. The image processing executed in this process is called print image processing. Details of the print image processing are described later.

The printer communication IF 209 is a communication interface for transmission and reception of image data, a print control signal, and the like between the controller 201 and the printer control unit 210. The printer control unit 210 controls various kinds of process processing executed by the process unit P depending on the image data received from the controller 201 and allows the print engine to execute printing.

[Description of Operations of Print Image Processing]

Figure 3A:
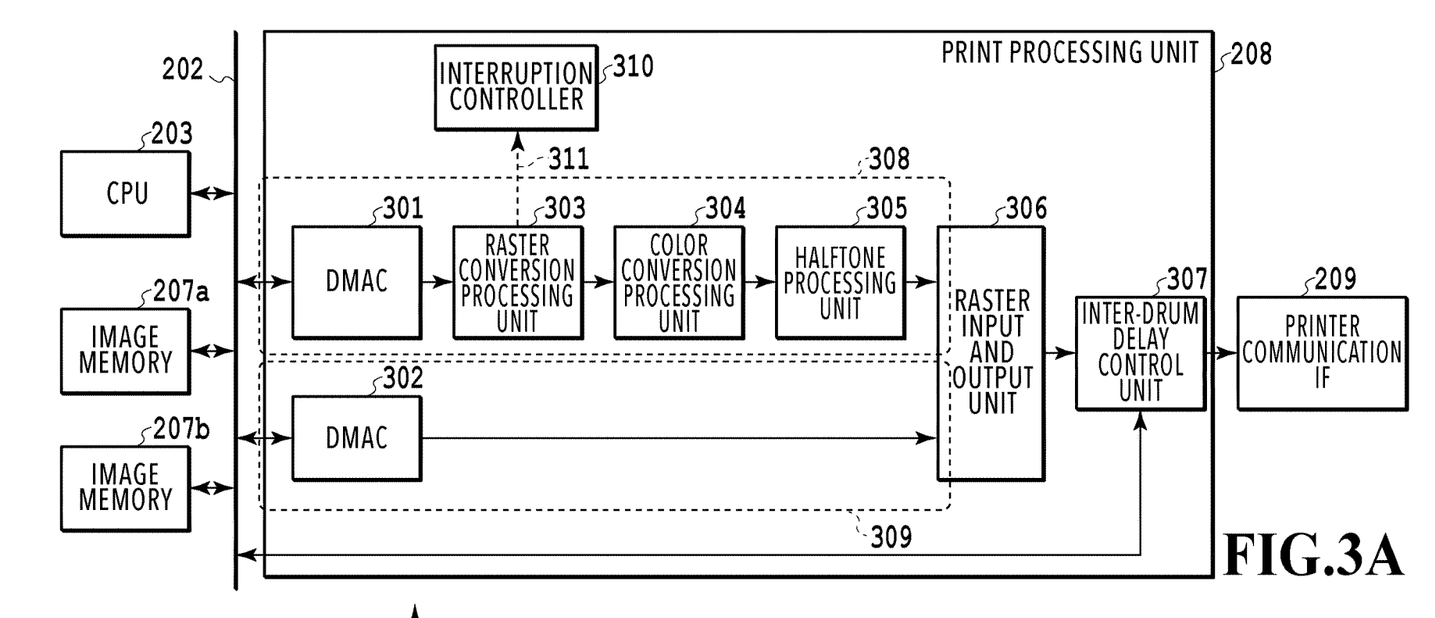
FIG. 3A is a diagram for describing operations of print image processing executed by a print processing unit.
Figure 3B:
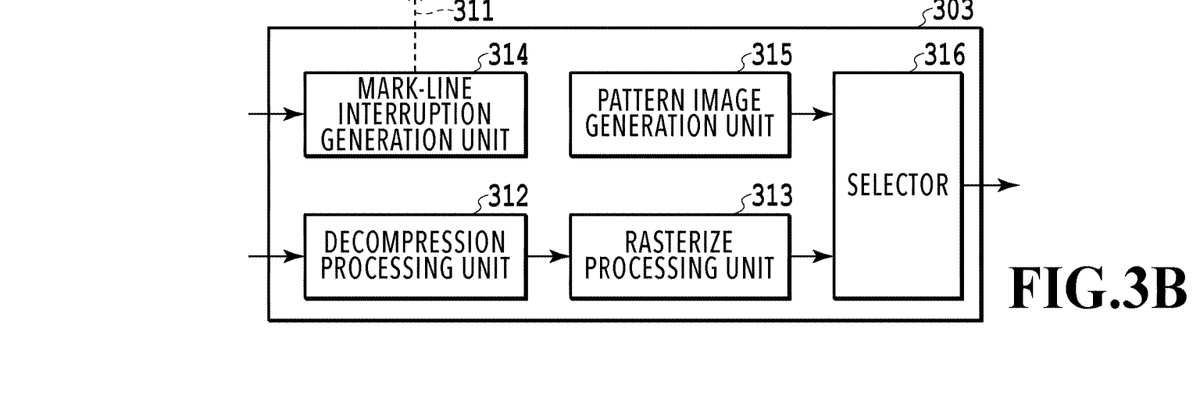
FIG. 3B is a diagram for describing operations of the print image processing executed by the print processing unit.

Next, operations of the print image processing executed by the print processing unit 208 are described with reference to FIGS. 3A and 3B. FIG. 3A illustrates a configuration of the print processing unit 208 of the image formation apparatus of this embodiment. The print processing unit 208 includes DMA controllers (hereinafter, called DMAC) 301 and 302, print image paths 308 and 309 respectively including the DMACs, a raster input and output unit 306, an inter-drum delay control unit 307, and an interruption controller 310. In addition to the DMAC 301, the print image path 308 includes a raster conversion processing unit 303, a color conversion processing unit 304, and a halftone processing unit 305. Hereinafter, the print image path 308 including the DMAC 301 is called a normal print path, and the print image path 309 including the DMAC 302 is called a proof print path. The DMAC 301 and the DMAC 302 may be called a first DMAC and a second DMAC, respectively. As illustrated in FIG. 3A, the image formation apparatus of this embodiment includes two image memories 207 (image memory 207a and image memory 207b). The image memory 207a is used for storing the compressed packet data generated through various jobs such as printing and scanning, for example. The image memory 207b is used for image processing works through the various jobs such as printing and scanning and for a buffer for inter-drum delay control, for example. The controller 201 may include any number of the image memories 207. Each of the image memories 207 may be used in any way.

The DMAC 301 obtains the compressed packet data, which is generated by the image generation unit 206 and stored in the image memory 207a, through the bus 202 and outputs the compressed packet data to the raster conversion processing unit 303. A configuration of the raster conversion processing unit 303 is now described. FIG. 3B illustrates the configuration of the raster conversion processing unit 303 in this embodiment. As illustrated in FIG. 3B, the raster conversion processing unit 303 includes a decompression processing unit 312, a rasterize processing unit 313, a mark-line interruption generation unit 314, a pattern image generation unit 315, and a selector 316.

The decompression processing unit 312 performs decompression processing of the compressed packet data that is transferred from the image memory 207a through the DMAC 301. The rasterize processing unit 313 performs the rasterize processing on the image data obtained by decompressing the compressed packet data. In this way, the raster image data including the RGB data and the attribute data indicating a data attribute of each pixel is generated. R data, G data, B data, and the attribute data are expressed by, for example, pixels of 10-bit of 0 to 1023 with a resolution of 600 dpi. A format of the raster image data is determined based on configurations and features of the abovementioned reading unit and image generation unit 206 and is not limited to this example.

The mark-line interruption generation unit 314 generates an interruption signal (called a mark-line interruption signal or simply called mark-line interruption) 311 that indicates that the rasterize processing of the previously set numbers of lines (hereinafter, called the rasterize processing line number) is completed. The mark-line interruption 311 is sent to the CPU 203 like other various interruption signals (unillustrated) through the interruption controller 310. The CPU 203 executes the later-described inter-drum delay memory control based on the timing of receiving the mark-line interruption 311. In this embodiment, the rasterize processing line number is previously determined depending on the features of the print engine and an amount of the image data processed by the image formation apparatus.

Once receiving a command of pattern image generation from the outside, the pattern image generation unit 315 generates raster image data of a previously prepared particular pattern (hereinafter, called pattern image data) within the pattern image generation unit 315 without inputting data from the outside, and outputs the generated data. The particular pattern is, for example, a characteristic pattern such as solid, stripes, grids, gradation, and the like. The pattern image data is mainly used for operation check of the print processing unit 208 and adjustment of the various kinds of process processing of the print engine. The selector 316 makes switching to determine which of the raster image data received from the rasterize processing unit 313 and the pattern image data received from the pattern image generation unit 315 is outputted to the following processing unit (in this case, the color conversion processing unit 304). For example, in a case where the pattern image generation unit 315 receives the command of the pattern image generation from the outside, the selector 316 outputs the pattern image data generated by the pattern image generation unit 315. Otherwise, the selector 316 outputs the raster image data received from the rasterize processing unit 313. In this embodiment, since the pattern image data is not used for the proof print processing of this embodiment, the raster conversion processing unit 303 does not necessarily include the pattern image generation unit 315 and the selector 316.

Back to description of FIG. 3A. The color conversion processing unit 304 converts the received raster image data to pieces of CMYK data corresponding to the toner colors used by the process unit P of the print engine. In this process, the color conversion processing unit 304 refers to the attribute data of each pixel and performs conversion to the CMYK data using a parameter depending on the attribute data. The thus-generated raster image data converted to the CMYK data is outputted to the halftone processing unit 305.

The halftone processing unit 305 performs halftone processing on the pieces of data (C data, M data, Y data, and K data) of the CMYK data received from the color conversion processing unit 304. A specific example of the halftone processing may be screen processing and error diffusion processing. The screen processing is processing that uses predetermined multiple dither matrixes to convert the input image data into N-values. The error diffusion processing is processing in which the input image data is compared with a predetermined threshold to convert the input image data into N-values and a thus-obtained difference between the input image data and the threshold is diffused to surrounding pixels that are not converted to N-values. The halftone processing unit 305 refers to the attribute data of each pixel and selects and executes the screen processing or the error diffusion processing depending on the attribute data. The data format after the halftone processing is determined depending on the resolution and bit accuracy of the print engine. For example, the pieces of data of the CMYK data after the halftone processing are expressed by pixels of 1-bit of 0 or 1 with a resolution of 2400 dpi. The raster image data of the printable CMYK data generated by the above-described processing is outputted to the raster input and output unit 306.

On the other hand, the DMAC 302 reads the uncompressed raster image data for the proof print stored in the image memory 207a through the bus 202 and transfers the read data to the raster input and output unit 306. The raster image data inputted to the proof print path 309 by the DMAC 302 is provided while being set to a directly printable format. For example, raster image data of the same format as that of the raster image data generated by the halftone processing unit 305 (e.g., a format expressed by pixels of 1-bit of 0 or 1 with a resolution of 2400 dpi) is inputted to the proof print path 309.

The raster input and output unit 306 outputs the raster image data that is inputted from the normal print path 308 or the proof print path 309 to the inter-drum delay control unit 307. The raster input and output unit 306 performs the various kinds of image processing on the raster image data inputted from the normal print path 308 and the proof print path 309. The various kinds of image processing in this case are printing position adjustment of the print engine, masking processing of an image end area, digital registration correction processing for adjusting mechanical misregistration, and the like.

The inter-drum delay control unit 307 controls reading and writing from and to the image memory 207b of the raster image data of each of the CMYK colors. In a case where an image is formed on the recording medium such as a recording sheet, it is required to adjust printing timings of the CMYK colors by respective periods corresponding to the distances between the photosensitive drums 1C, 1M, 1Y, and 1K in accordance with a transportation speed (called a print engine speed) of the recording medium. For this reason, the inter-drum delay control unit 307 temporarily buffers the raster image data of the CMYK colors received from the raster input and output unit 306 into the image memory 207b. Then, the inter-drum delay control unit 307 reads the temporarily buffered image data from the image memory 207b at a timing corresponding to each inter-drum distance between the CMYK colors, that is, a timing of inter-drum delay between the CMYK colors. Based on the command of starting reading from the CPU 203 based on the mark-line interruption 311 generated by the raster conversion processing unit 303, the inter-drum delay control unit 307 starts reading of the image data from the image memory 207b. The raster image data of the CMYK colors read at the timing of inter-drum delay is outputted to the printer control unit 210 through the printer communication IF 209. Such inter-drum delay control allows the print engine to accurately overlap the toner images respectively transferred from the photosensitive drums 1C, 1M, 1Y, and 1K with each other on the intermediate transfer belt 51. In this way, the multicolor toner image made of the four colors (full-color image) is formed on the recording medium.

Figure 4A:
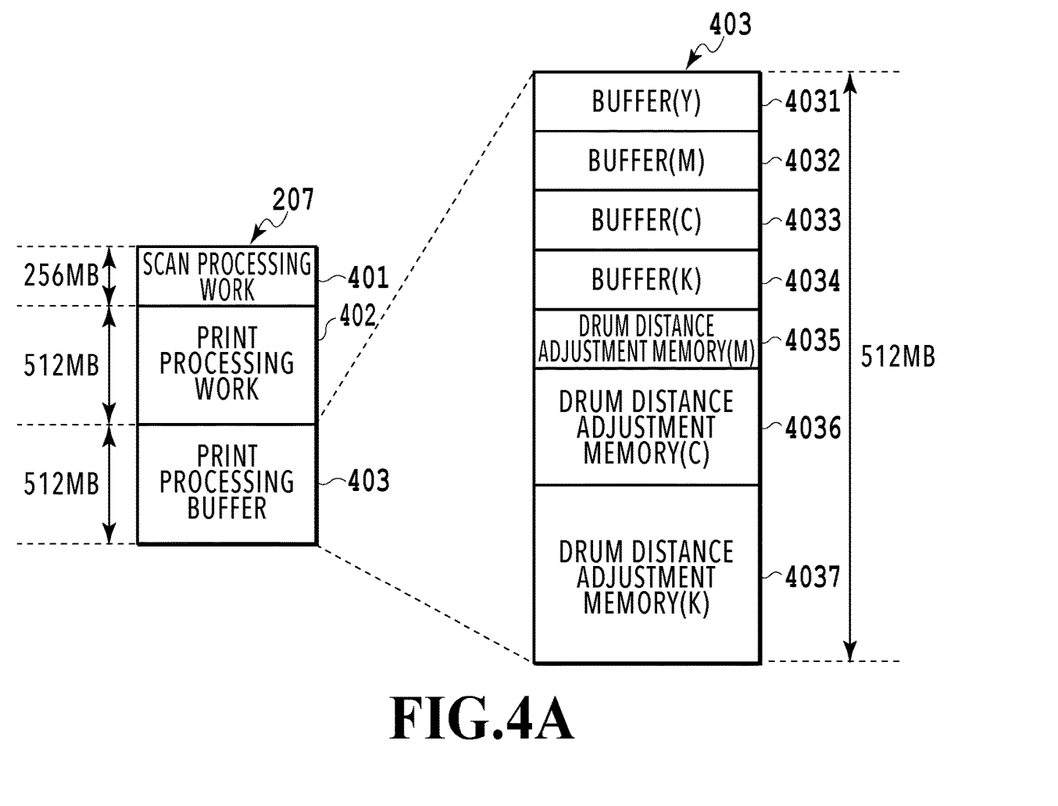
FIG. 4A is a diagram for describing memory allocation in an image memory.
Figure 4B:
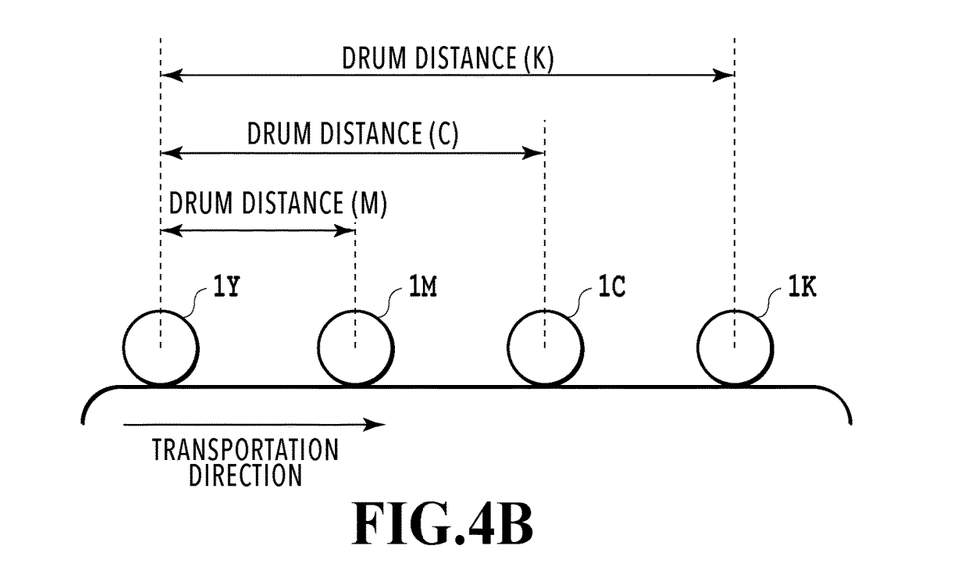
FIG. 4B is a diagram for describing the memory allocation in the image memory.

Now, memory allocation in the image memory 207b is described with reference to FIGS. 4A and 4B. FIGS. 4A and 4B are diagrams for describing the memory allocation in the image memory 207b. FIG. 4A illustrates an example of the memory allocation in the image memory 207b. In the image memory 207b of this embodiment, regions of a scan processing work 401, a print processing work 402, and a print processing buffer 403 are allocated while having sizes of 256 megabytes (MB), 512 MB, and 512 MB, respectively. The scan processing work 401 is a region used as a work memory for scan processing. The print processing work 402 is a region used as a work memory for print processing. The print processing buffer 403 is a region used for inter-drum delay control in print processing. Specifically, the print processing buffer 403 is a region used as a buffer in which the inter-drum delay control unit 307 temporarily puts the raster image data. The print processing buffer 403 includes regions respectively allocated to the CMYK colors (buffers 4031 to 4034) and regions respectively allocated to the MCK colors (drum distance adjustment memories 4035 to 4037). The buffers 4031 to 4034 are buffer memories for absorbing a speed difference between writing and reading of data to and from the image memory 207b. The drum distance adjustment memories are allocated depending on the inter-drum distances between the photosensitive drums 1Y, 1M, 1C, and 1K illustrated in FIG. 4B and a data size corresponding to the transportation speed of the recording medium (recording sheet).

[Print Processing]

Figure 5A:
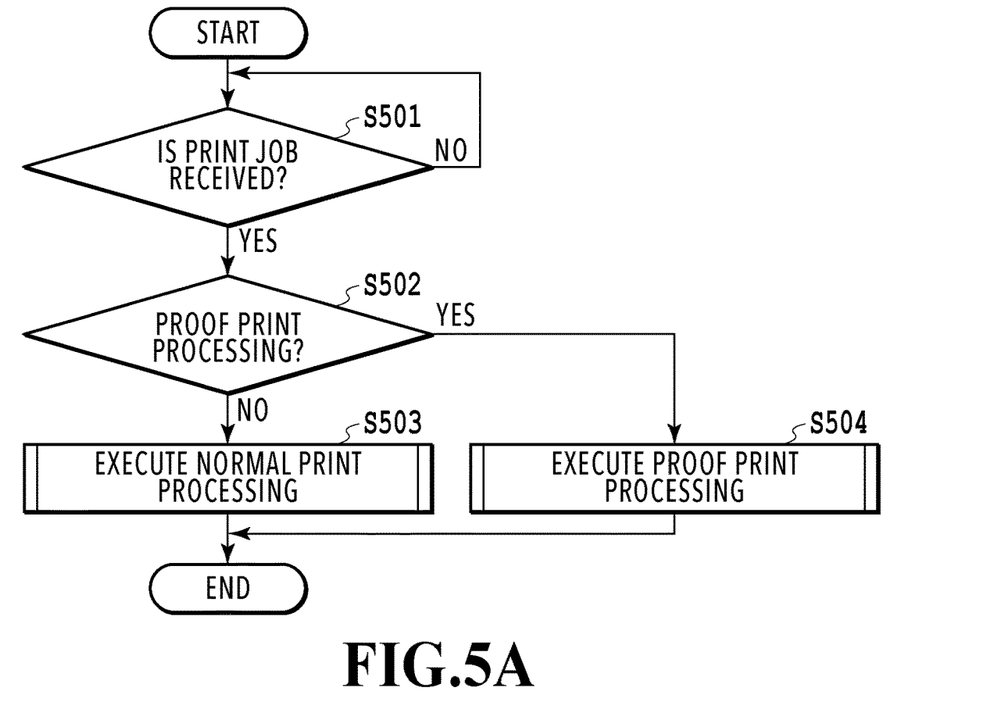
FIG. 5A is a diagram for describing print processing control in the controller of the first embodiment.
Figure 5B:
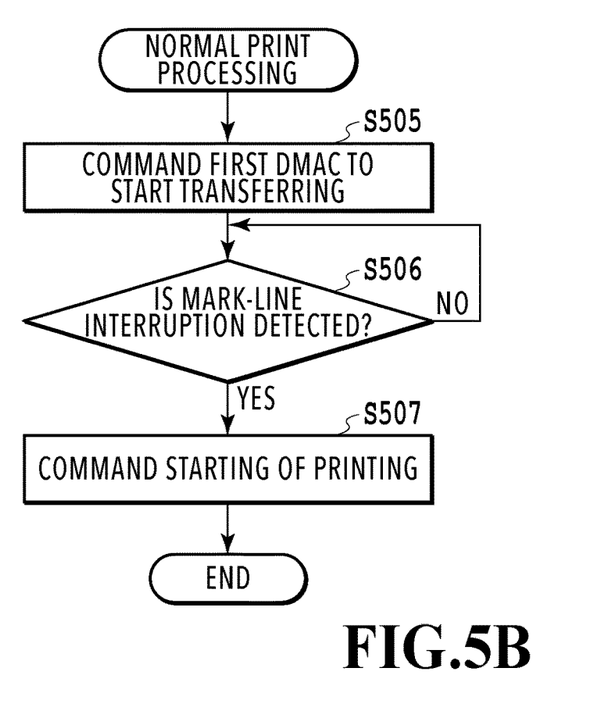
FIG. 5B is a diagram for describing the print processing control in the controller of the first embodiment.
Figure 6:
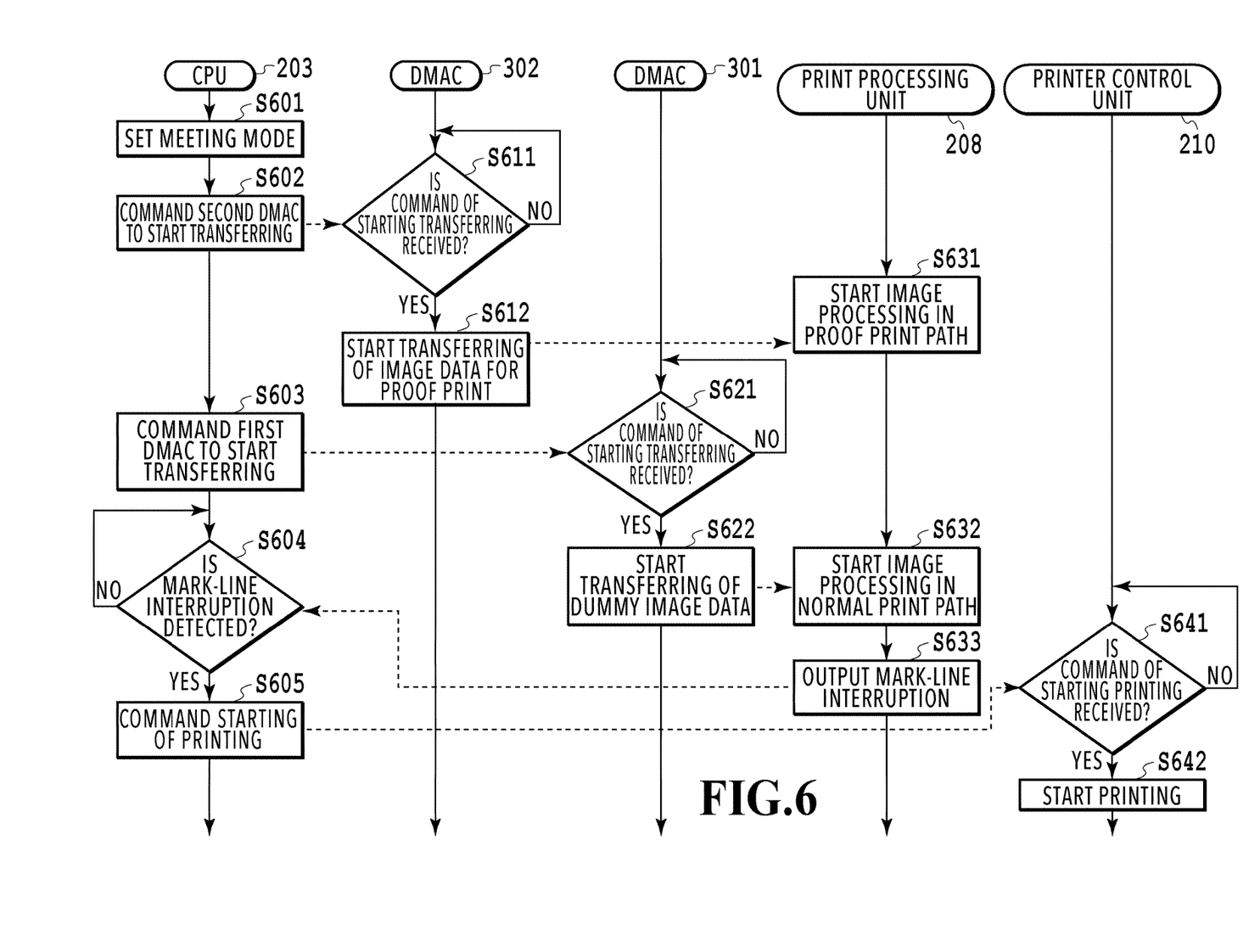
FIG. 6 is a diagram that illustrates an example of a sequence of proof print processing of the first embodiment.

Next, operations of normal print processing and proof print processing are described with reference to FIGS. 5A, 5B, and 6. FIGS. 5A and 5B are diagrams for describing print processing control in the controller 201 of the first embodiment. FIG. 5A illustrates a procedure of the print processing control by the controller 201. First, once receiving a job from an operation unit (unillustrated) or another computer (unillustrated), the controller 201 determines whether the received job is a print job (step S501). Hereinafter, step S501 is simply called S501 and the same applies to other steps. If the received job is not the print job (NO in S501), the controller 201 repeats the processing of S501. If the received job is the print job (YES in S501), the controller 201 determines whether the received print job is a job for the proof print processing (S502). If it is determined that the received print job is not the job for the proof print processing (NO in S502), the process proceeds to S503 and the controller 201 executes the normal print processing. Details of the processing in S503 are described later with reference to FIG. 5B. On the other hand, if it is determined that the received print job is the job for the proof print processing (YES in S502), the process proceeds to S504 and the controller 201 executes the proof print processing. Details of the processing in S504 are described later with reference to FIG. 6.

[Normal Print Processing]

FIG. 5B illustrates a procedure of the normal print processing in S503 in FIG. 5A. First, the CPU 203 commands the DMAC 301 to start transferring (S505). With this command, the image data (compressed packet data) is transferred from the image memory 207a to the normal print path 308, and the image processing on the compressed packet data is started in the normal print path 308. In this process, the raster conversion processing unit 303, the color conversion processing unit 304, the halftone processing unit 305, and the raster input and output unit 306 perform the image processing on the image data (compressed packet data) transferred to the normal print path 308. Then, the image-processed image data (raster image data) is outputted to the inter-drum delay control unit 307. The inter-drum delay control unit 307 writes the raster image data inputted from the raster input and output unit 306 into the image memory 207b.

Next, the CPU 203 determines whether the mark-line interruption 311 is detected (S506). As described above, in the normal print path 308 in this embodiment, the mark-line interruption 311 is outputted at a timing when the processing on predetermined pieces (the rasterize processing line number) of the raster image data is completed. If the mark-line interruption 311 is detected (YES in S506), the CPU 203 commands the printer control unit 210 to start printing. Then, reading of the image data (raster image data) stored in the image memory 207b starts, and printing by the print engine is executed. In this process, the inter-drum delay control unit 307 reads the image data (the raster image data generated through the blocks 303 to 306) from the image memory 207b. Then, the read image data is outputted to the printer control unit 210 through the inter-drum delay control unit 307 and the printer communication IF 209.

The above-described processing allows the print engine to execute printing at a timing when image data of a sufficient size is stored in the print processing buffer 403 illustrated in FIG. 4A. This prevents start of the printing in a case where the raster image data required for executing the printing is not prepared yet. Consequently, it is possible to properly execute the printing.

[Proof Print Processing]

Next, details of the operations of the proof print processing in S504 in FIG. 5A are described with reference to FIG. 6. FIG. 6 is a diagram that illustrates an example of a sequence of the proof print processing of the first embodiment.

First, in a case where the job received in the processing in S502 is the proof print job, the CPU 203 of the controller 201 sets the raster input and output unit 306 of the print processing unit 208 to a waiting mode (S601). The waiting mode is a mode in which in a case where image data is inputted to the raster input and output unit 306 first from any one of the normal print path and the proof print path, the raster input and output unit 306 stops the input of the image data from the one path until the image data is inputted from the other path to the raster input and output unit 306, and outputs the image data from the proof print path to the inter-drum delay control unit 307. The flow of the image data during the waiting mode is described later with reference to FIG. 7.

Next, the CPU 203 commands the DMAC 302 to start transferring of the raster image data processed by the proof print path 309 (S602). With this command, the uncompressed raster image data is transferred from the image memory 207a to the proof print path 309 (specifically, the raster input and output unit 306), and the image processing on the uncompressed raster image data is started in the proof print path 309. The image processing in this process is mask processing and the like executed in the raster input and output unit 306.

Next, the CPU 203 commands the DMAC 301 to start transferring of dummy data (compressed packet data) to be processed by the normal print path 308 (S603). With this command, the compressed packet data is transferred from the image memory 207a to the normal print path 308, and the image processing on the compressed packet data is started in the normal print path 308. The compressed packet data processed in the normal print path 308 in this process is not to be printed by the print engine. Thus, any compressed packet data (e.g., compressed packet data generated from image data of all-white sheet) having a data size after decompression that is the same as the data size of the image data for the proof print (uncompressed raster image data) may be used as the dummy data. The dummy data is generated in the controller 201 before the processing of S603 is executed, and stored in the image memory 207a.

Next, the CPU 203 determines whether the mark-line interruption 311 that is outputted by the print processing unit 208 in the later-described S633 is received (S604). That is, in the image processing on the dummy data executed in the normal print path 308 of the print processing unit 208, the CPU 203 determines whether the processing on the predetermined line number of the raster image data is completed and the mark-line interruption 311 is outputted. In this way, the CPU 203 waits until the mark-line interruption 311 is outputted. The rasterize processing line number is set to the raster conversion processing unit 303 by the CPU 203 in S601. A setting value of the rasterize processing line number in the proof print processing is greater than that in the normal print processing. Since the uncompressed raster image data is inputted to the print processing unit 208 in the proof print processing, the supply speed to the print processing buffer 403 of the image memory 207b is slower than the normal print processing. For this reason, it is required to sufficiently secure a buffer size of the image data. If the reception of the mark-line interruption 311 is indicated (YES in S604), the CPU 203 commands the printer control unit 210 to start printing (S605). Then, reading of the image data for the proof print (uncompressed raster image data) buffered in the image memory 207b by the print processing unit 208 is started, and the printing by the print engine is executed. In this process, as described above, the inter-drum delay control unit 307 reads the image data from the image memory 207b. The processes of steps S604 and S605 are executed repeatedly until all pieces of the image data for the proof print are transferred to the print engine.

The DMAC 302 of the controller 201 determines whether the command of starting the transferring that is outputted from the CPU 203 is received in S602 (S611). If the command of starting the transferring is not received (NO in S611), the DMAC 302 repeats the processing of S611 until receiving the command. If the command of starting the transferring is received (YES in S611), the DMAC 302 reads the image data for the proof print (uncompressed raster image data) stored in advance in a predetermined region in the image memory 207a and transfers the data to the raster input and output unit 306 (S612). In this way, the image processing on the image data for the proof print is executed by the raster input and output unit 306, and the image-processed image data is stored in the image memory 207b through the inter-drum delay control unit 307. The image data for the proof print is, for example, written by a user in advance in the predetermined region in the image memory 207a through an external memory device (such as a USB memory) and a network.

The DMAC 301 of the controller 201 determines whether the command of starting the transferring that is outputted from the CPU 203 is received in S603 (S621). If the command of starting the transferring is not received (NO in S621), the DMAC 301 repeats the processing of S621 until receiving the command. If the command of starting the transferring is received (YES in S621), the DMAC 301 reads the dummy data for the normal print path (compressed packet data) stored in advance in a predetermined region in the image memory 207a. Then, the DMAC 301 transfers the read compressed packet data to the raster conversion processing unit 303 (S622). In this way, the image processing of the dummy data is executed in the normal print path 308, and the image-processed dummy data is inputted to the raster input and output unit 306. The image-processed dummy data is discarded in the raster input and output unit 306.

With the above-described processing, the raster image data is inputted from both the normal print path 308 and proof print path 309 to the raster input and output unit 306.

The print processing unit 208 of the controller 201 starts the image processing in the proof print path 309 on the uncompressed raster image data for the proof print transferred from the DMAC 302 in S612 (S631). In the proof print path 309, the uncompressed raster image data is directly transferred from the DMAC 302 to the raster input and output unit 306, and the image processing such as mask processing is performed on the uncompressed raster image data by the raster input and output unit 306. The print processing unit 208 starts to perform the sequential image processing (the image processing of the blocks 303 to 305) in the normal print path 308 on the dummy data for the normal print (compressed packet data) transferred from the DMAC 301 in S622 (S632). In this process, the raster conversion processing unit 303 in the normal print path 308 executes the decompression processing and the rasterize processing on the dummy data (compressed packet data). Then, at a timing when generation of the previously set line number (the rasterize processing line number) of the raster image data is completed, the raster conversion processing unit 303 outputs the mark-line interruption 311 (S633).

The printer control unit 210 determines whether the command of starting printing that is outputted from the CPU 203 is received in S605 (S641). If the command of starting printing is not received (NO in S641), the printer control unit 210 repeats the processing of S641 until receiving the command of starting printing. If the command of starting printing is received (YES in S641), the printer control unit 210 commands the print processing unit 208 through the printer communication IF 209 to start reading of the image data stored in the image memory 207b. With this command, the inter-drum delay control unit 307 starts reading of the image data, and the image data for the proof print stored in the image memory 207b is outputted to the printer control unit 210 through the inter-drum delay control unit 307 and the printer communication IF 209. The printer control unit 210 controls the various kinds of process processing by the process unit P performed on the image data received from the print processing unit 208 and executes the printing (S642).

[Dataflow of Proof Print Processing]

Figure 7:
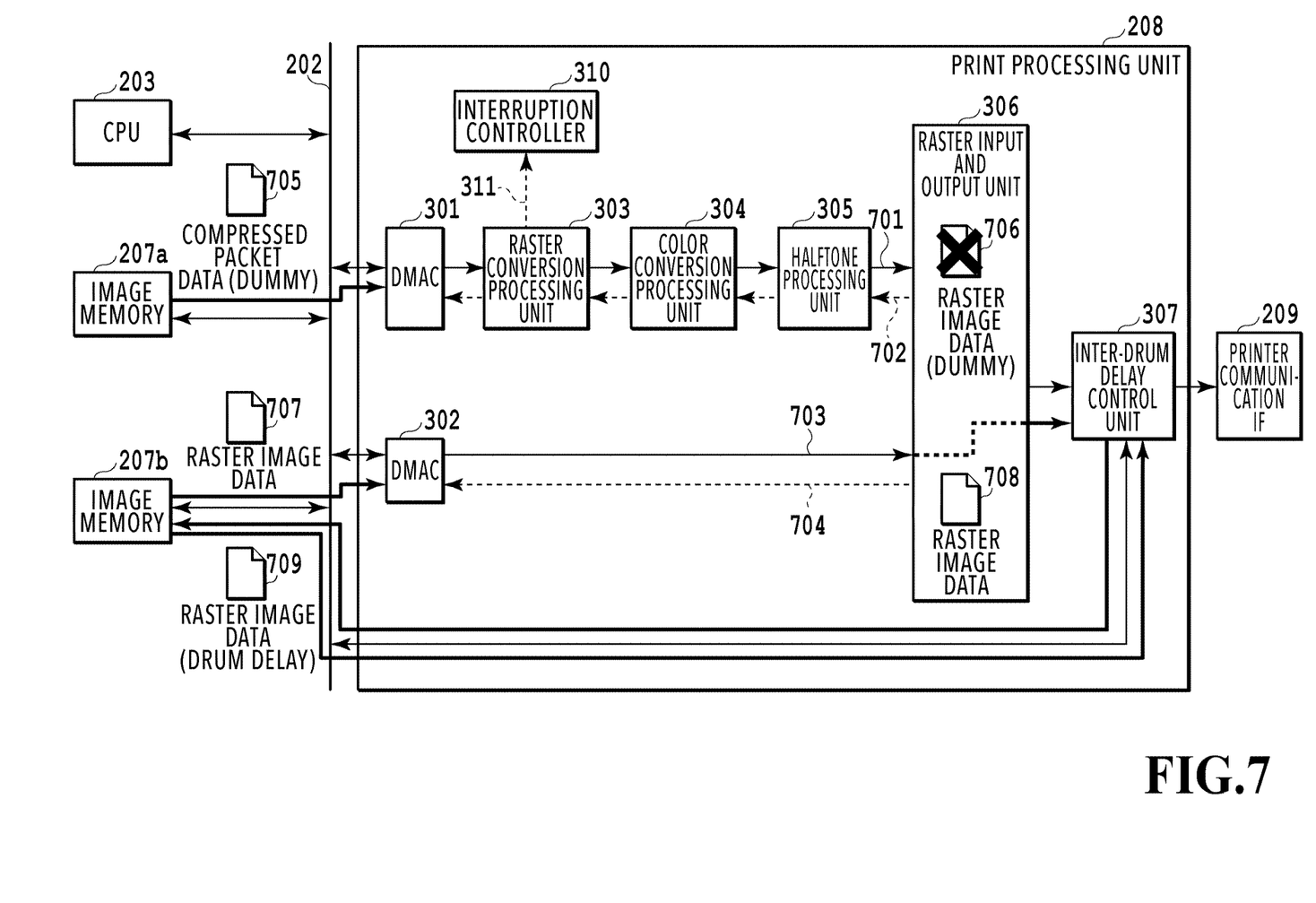
FIG. 7 is a diagram for describing dataflow of the proof print processing of the first embodiment.

Next, dataflow of the proof print processing of this embodiment is described with reference to FIG. 7. FIG. 7 is a diagram for describing the dataflow of the proof print processing of the first embodiment. As described above, the image formation apparatus of this embodiment executes the proof print processing while setting the waiting mode. Thus, FIG. 7 illustrates the dataflow of the proof print processing during the waiting mode.

First, in the normal print path, dummy compressed packet data 705 stored in the image memory 207a is transferred to the raster conversion processing unit 303 in the normal print path through the DMAC 301, and the sequential image processing is executed. Dummy raster image data 706 generated by the sequential image processing is inputted to the raster input and output unit 306. Since the dummy raster image data 706 is not used for the proof print, the dummy raster image data 706 is discarded in the raster input and output unit 306. Once the rasterize processing on the predetermined line number of the dummy compressed packet data 705 is completed in the raster conversion processing unit 303, the mark-line interruption 311 is outputted.

On the other hand, in the proof print path, raster image data 707 stored in the image memory 207b is directly transferred to the raster input and output unit 306 through the DMAC 302. Then, the image processing is performed on the raster image data 707 in the raster input and output unit 306, and raster image data 708 is obtained. The raster image data 708 is transferred to the inter-drum delay control unit 307 and is stored in the print processing buffer 403 of the image memory 207b. Then, the raster image data 708 read from the image memory 207b by the inter-drum delay control unit 307 at a timing corresponding to the inter-drum distance between the CMYK colors, or the raster image data 708 after the inter-drum delay control, is transferred to the printer communication IF 209. Raster image data 709 illustrated in FIG. 7 indicates the raster image data 708 after the inter-drum delay control.

Now, the timing of the data input and output and the timing of the mark-line interruption output in the print processing unit 208 during the waiting mode are described.

A data signal 701 illustrated in FIG. 7 is a signal for transferring the image data between the blocks 301, 303, 304, 305, and 306 in the normal print path. Data signal 703 is a signal for transferring the image data between the blocks 302 and 306 in the proof print path. The data signals 701 and 703 are signals transferred at a predetermined bit width (e.g., 32-bit/clock cycle) per unit time. The data signals 701 and 703 allow the pieces of the raster image data of the CMYK colors are transferred to the raster input and output unit 306. Stall signals 702 and 704 are signals that allow the blocks in the normal print path and the proof print path to stop transferring of the image data from an upstream block (transfer source).

In a case where the data transfer is performed in both the normal print path and proof print path during the waiting mode, the data transfer in the proof print path in which the uncompressed data is transferred is slower than the data transfer in the normal print path in which the compressed data is transferred. Thus, the raster image data is inputted to the raster input and output unit 306 from the normal print path and the proof print path at different data transfer speeds. For this reason, in this embodiment, the stall signals 702 and 704 are transmitted to the upstream block to adjust the data transfer speed in accordance to a lower data transfer speed of either the normal print path or proof print path (in this case, proof print path). For example, in a case where the data signal 701 from the normal print path is inputted to the raster input and output unit 306 first, the raster input and output unit 306 outputs the stall signal 702 to the normal print path until receiving input of the data signal 703 from the proof print path. Like this, in a case where either the data signal 701 or 703 is inputted first, the raster input and output unit 306 outputs the stall signal to a path from which the data signal is inputted first until the data signal from the other is inputted. Then, at a timing when both the data signal 701 and data signal 703 are inputted, the raster input and output unit 306 outputs input data of the data signal 703 in the proof print path to the inter-drum delay control unit 307.

The upstream blocks control output of the data signals 701 and 703 to downstream blocks depending on the stall signals 702 and 704 that are generated by the raster input and output unit 306 and propagated from the downstream blocks.

With such control, input timing of the image data from the normal print path and the proof print path to the raster input and output unit 306 is adjusted. With this timing adjustment, the raster conversion processing unit 303 in the normal print path generates the mark-line interruption 311 while the transfer speeds of the image data in the normal print path and the proof print path are adjusted by the raster input and output unit 306. This makes it possible to execute the inter-drum delay control on the image data in the proof print path at a proper timing by using the mark-line interruption 311 generated in the normal print path during the proof print processing.

As described above, in this embodiment, the inter-drum delay control is performed on the image data in the proof print path by generating the mark-line interruption in the normal print path using the dummy data. With such a configuration, there is no need to change the control sequence in the normal print (processes of S505 to S507 in FIG. 5B and processes of S603 to S605 in FIG. 6). Consequently, it is possible to simply implement the function of the proof print in the image forming apparatus that performs the inter-drum delay control using the mark-line.

Second Embodiment

In the example of the first embodiment, in the case of executing the print job of the proof print, the controller executes the proof print without changing the control sequence of the normal print by executing the print image processing of the waiting mode with the normal print path. Like the first embodiment, the controller of this embodiment also executes the print image processing of the waiting mode. However, a controller 201 of this embodiment does not transfer the dummy data to the normal print path in the case of executing the print job of the proof print. The configuration of the controller 201 of this embodiment is similar to that of the first embodiment illustrated in FIGS. 2, 3A, and 3B.

[Proof Print Processing Control Flow]

The proof print processing (processing of S504) of this embodiment is described with reference to FIG. 8.

Figure 8:
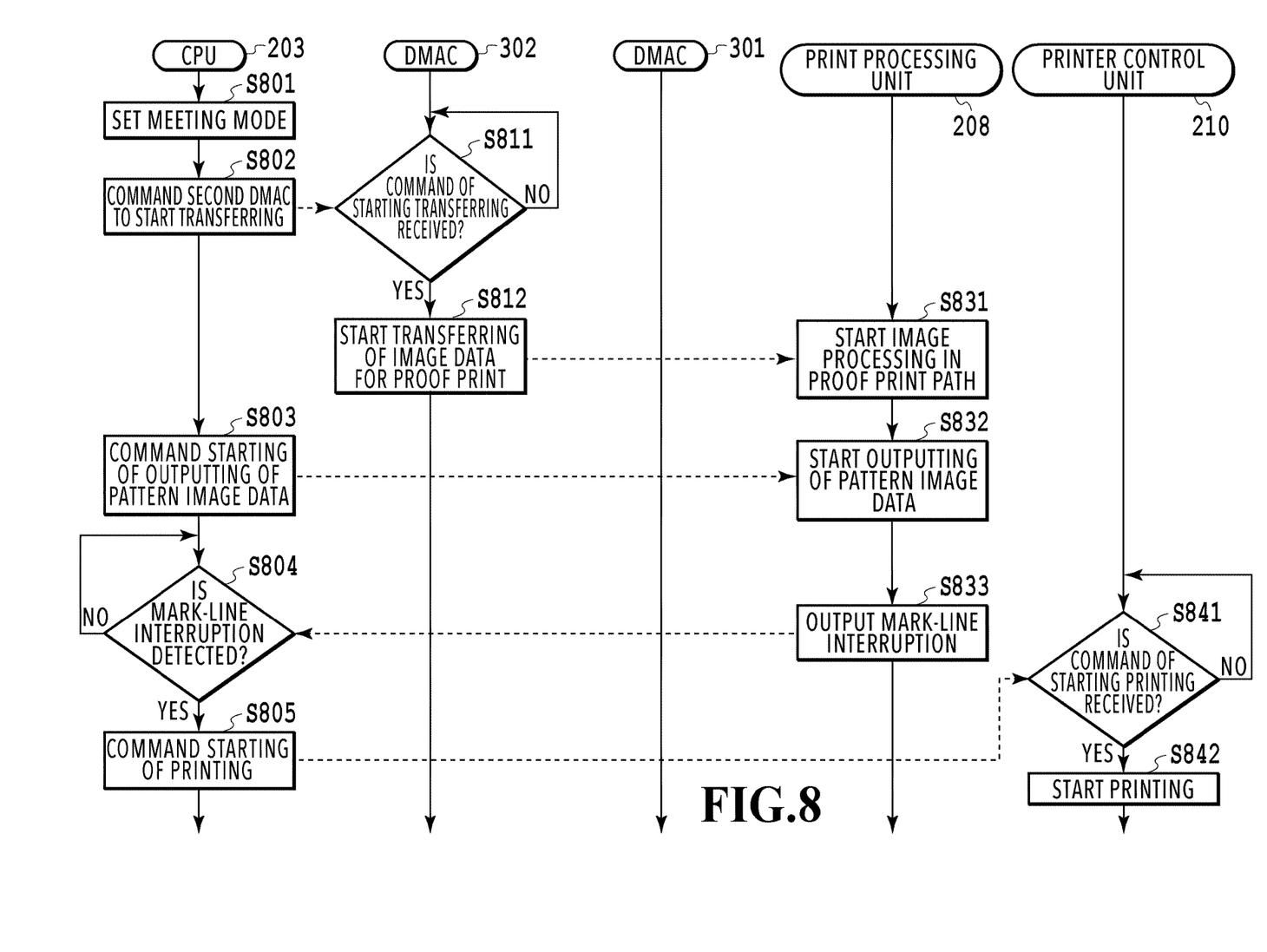
FIG. 8 is a diagram that illustrates an example of a sequence of proof print processing of a second embodiment.

FIG. 8 is a diagram that illustrates an example of a sequence of the proof print processing of the second embodiment. Processes of S801, S802, S804, S805, S811, S812, S831, S841, and S842 are similar to the processes of S601, S602, S604, S605, S611, S612, S631, S641, and S642 in the first embodiment.

After S802, the CPU 203 commands the pattern image generation unit 315 of the raster conversion processing unit 303 to start generating the dummy data (pattern image data) (S803).

After S831, once receiving the command of starting generation of the pattern image data from the CPU 203, the print processing unit 208 generates the pattern image data in the pattern image generation unit 315 of the raster conversion processing unit 303 (S832). The pattern image data is not used (printed) for the proof print processing. The pattern image data may be any image data as long as the size is the same as that of the image data for the proof print.

The print processing unit 208 starts the sequential image processing in the normal print path 308 on the pattern image data generated by the pattern image generation unit 315. In this process, once the predetermined line number (the rasterize processing line number) of the pattern image data is generated in the pattern image generation unit 315, the mark-line interruption 311 is outputted (S833). The pattern image data (raster image data) done with the sequential image processing in the normal print path 308 is inputted to the raster input and output unit 306.

[Dataflow of Proof Print]

Figure 9:
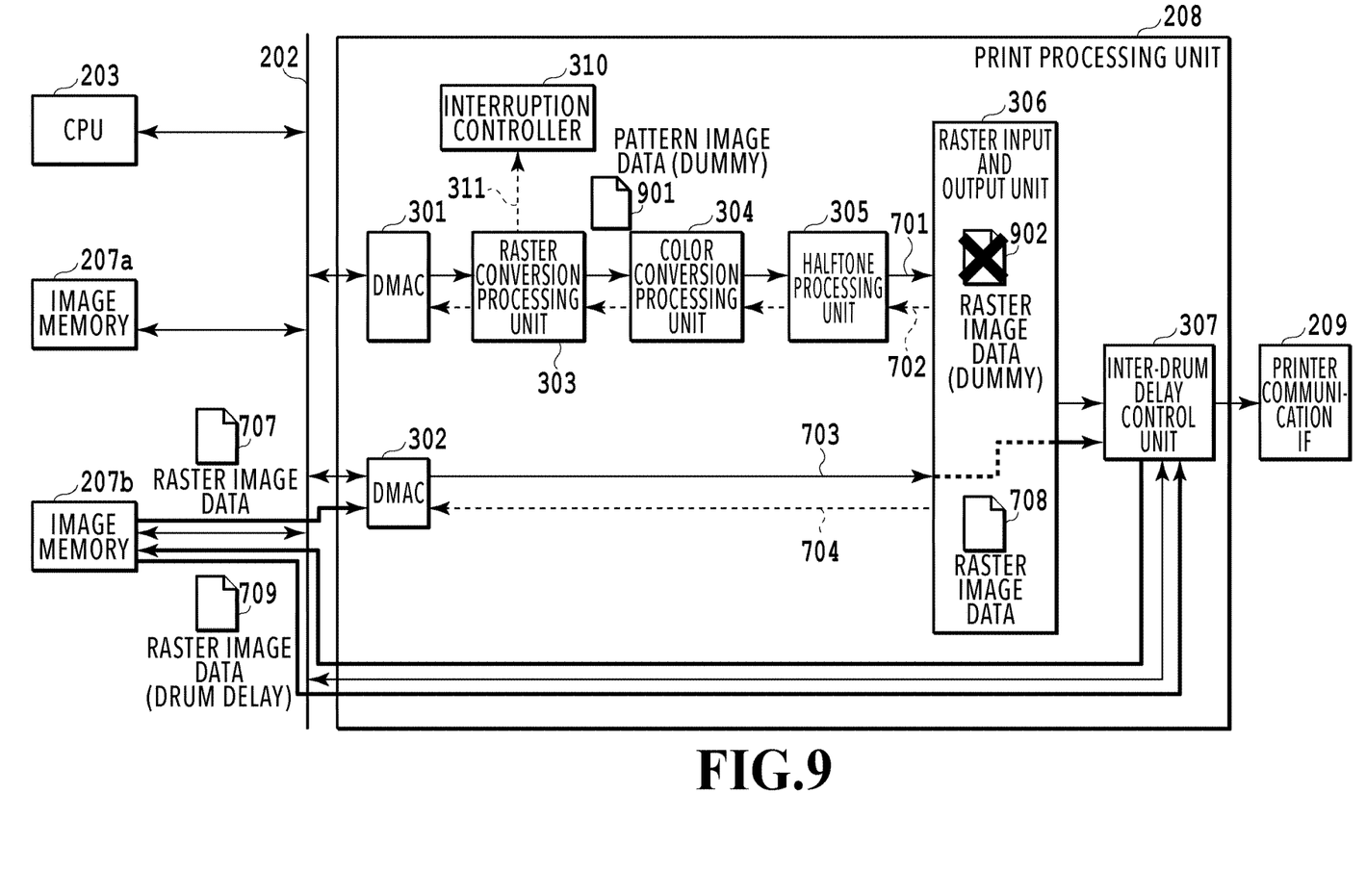
FIG. 9 is a diagram for describing dataflow of the proof print processing of the second embodiment.

Next, dataflow of the proof print processing of this embodiment is described with reference to FIG. 9. FIG. 9 is a diagram for describing the dataflow of the proof print processing of the second embodiment. The dataflow of the proof print processing of this embodiment is similar to the dataflow of the first embodiment illustrated in FIG. 7. However, the dataflow in the normal print path is different from that in the first embodiment.

In the normal print path of this embodiment, the sequential image processing is executed on dummy data (pattern image data) 901 generated by the pattern image generation unit 315 of the raster conversion processing unit 303. Dummy data (raster image data) 902 generated by performing the sequential image processing on the dummy data 901 is inputted to the raster input and output unit 306. Since the dummy data 902 is not used for the proof print, the dummy data 902 is discarded in the raster input and output unit 306. Every time the predetermined line number of the dummy data are generated in the raster conversion processing unit 303, the mark-line interruption 311 is outputted.

As described above, in the second embodiment, in the case of executing the proof print processing during the waiting mode, the mark-line interruption is generated by using the dummy pattern image data generated in the image processing blocks in the normal print path. Thus, there is no need to input the dummy data to the normal print path in the case of executing the proof print processing during the waiting mode. Consequently, there is no need to secure a memory size and a memory bandwidth for transferring the dummy data from the image memory to the normal print path. This makes it possible to prevent degradation of the proof print processing performance even though the proof print processing is executed during the waiting mode.

The technique of the present disclosure may be implemented by processing in which a program implementing one or more functions of the above-described embodiments is supplied to a system or an apparatus through a network or a storage medium and one or more processors in a computer of the system or the apparatus read and execute the program. Otherwise, the present invention may be implemented by a circuit implementing one or more functions (e.g., ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to properly execute proof print with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145884, filed Aug. 2, 2018, which is hereby incorporated by reference wherein in its entirety.

What is claimed is:

1. An image processing apparatus connected to an engine controller for controlling a printer engine, the image processing apparatus comprising:
a control device including a processor;
a first processing device that processes image data received by the first processing device;
a second processing device that processes the image data processed by the first processing device;
one or more memories that stores the image data processed by the second processing device,
wherein the first processing device issues a signal based on the first processing device having processed a predetermined amount of data in the received image data so that the engine controller starts to obtain image data from the one or more memories,
wherein the control device provides dummy data to the first processing device so that the first processing device processes the dummy data and issues the signal,
wherein the control device provides to the one or more memories, not via the first or second processing device, image data to be printed,
wherein the second processing device discards the dummy data processed by the first processing device, and
wherein the engine controller obtains the image data to be printed from the one or more memories.

2. The image processing apparatus according to claim 1, wherein the first processing device decompresses the received image data,
wherein the second processing device processes the decompressed image data.

3. The image processing apparatus according to claim 2, wherein the first processing device receives compressed image data.

4. The image processing apparatus according to claim 1, wherein the first processing device processes the dummy data.

5. The image processing apparatus according to claim 1, wherein the one or more memories stores the dummy data.

6. The image processing apparatus according to claim 1, wherein the dummy data is any image data that has, after processing by the first processing device, a data size which is the same as a data size of the image data to be printed which is provided to the one or more memories not via the first or second processing device.

7. The image processing apparatus according to claim 1, wherein the second processing device is inputted both of (1) the dummy data processed by the first processing device and (2) the image data processed by the first processing device, and
wherein the second processing device stores in the one or more memories only the image data processed by the second processing device.

8. The image processing apparatus according to claim 1, wherein in a case where the image data processed by the first processing device is not the dummy data, the control device issues the signal based on the first processing device having processed the predetermined amount of data,
wherein in a case where the image data processed by the first processing device is the dummy data, the control device issues the signal based on the first processing device having processed a different predetermined amount of data, and
wherein the predetermined amount for the dummy data is greater than the predetermined amount for the non-dummy data.

9. The image processing apparatus according to claim 1, wherein the second processing device adjusts a transfer speed at which the first processing device transfers the dummy data processed by the first processing device and a transfer speed at which the first processing device transfers the image data processed by the first processing device such that the transfer speeds correspond to each other.

10. The image processing apparatus according to claim 9, wherein in a case where one of the transfer speeds of the dummy data and the image data processed by the first processing device is faster than the other, the second processing device adjusts the transfer speeds of the dummy data and the image data processed by the first processing device by outputting a stall signal for stopping the data transfer to a transfer source of either of the dummy data and the image data which can be transferred at the faster speed.

11. An image processing method in an image processing apparatus connected to an engine controller for controlling a printer engine, wherein the image processing apparatus comprises (a) a first processing device that processes received image data, (b) a second processing device that processes the image data processed by the first processing device, and (c) one or more memories that stores the image data processed by the second processing device, wherein the first processing device issues a signal based on the first processing device having processed a predetermined amount of data in the received image data so that the engine controller starts to obtain image data from the one or more memories, the method comprising:

a first providing step of a control device providing dummy data to the first processing device so that the first processing device processes the dummy data and issues the signal;

a second providing step of the control device providing to the one or more memories, not via the first or second processing device, image data to be printed;

a processing step of the first processing device processing the dummy data received from the control device;

a discarding step of the second processing device discarding the dummy data processed in the processing step; and an obtaining step of the engine controller obtaining the image data to be printed from the one or more memories.

12. A non-transitory computer-readable storage medium storing a program causing a computer to execute steps in a method in an image processing apparatus connected to an engine controller for controlling a printer engine, wherein the image processing apparatus comprises (a) a first processing device that processes received image data, (b) a second processing device that processes the image data processed by the first processing device, (c) and one or more memories that stores the image data processed by the second processing device, wherein the first processing device issues a signal based on the first processing device having processed a predetermined amount of data in the received image data so that the engine controller starts to obtain image data from the one or more memories, the method comprising:

a first providing step of a control device providing dummy data to the first processing device so that the first processing device processes the dummy data and issues the signal;

a second providing step of the control device providing to the one or more memories, not via the first or second processing device, image data to be printed;

a processing step of the first processing device processing dummy data received by the control device;

a discarding step of the second processing device discarding the dummy data processed in the processing step; and an obtaining step of the engine controller obtaining the image data to be printed from the one or more memories.

* * * * *